(12) United States Patent
Kondo et al.

(10) Patent No.: US 10,176,847 B2
(45) Date of Patent: Jan. 8, 2019

(54) PRINTER

(71) Applicant: BROTHER KOGYO KABUSHIKI KAISHA, Nagoya-shi, Aichi (JP)

(72) Inventors: Koichi Kondo, Inuyama (JP); Feng Zhu, Nagoya (JP); Keigo Kako, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/713,962

(22) Filed: Sep. 25, 2017

(65) Prior Publication Data

US 2018/0277162 A1 Sep. 27, 2018

(30) Foreign Application Priority Data

Mar. 27, 2017 (JP) ................. 2017-061515

(51) Int. Cl.
| | | |
|---|---|---|
| H04N 1/00 | (2006.01) | |
| G11B 27/10 | (2006.01) | |
| B41J 3/46 | (2006.01) | |
| G06K 15/02 | (2006.01) | |
| B41J 3/407 | (2006.01) | |
| B41J 2/335 | (2006.01) | |
| G06F 3/12 | (2006.01) | |

(52) U.S. Cl.
CPC .......... *G11B 27/107* (2013.01); *B41J 3/4075* (2013.01); *B41J 3/46* (2013.01); *G06K 15/022* (2013.01); *B41J 2/3352* (2013.01); *G06F 3/1204* (2013.01); *G06K 2215/0097* (2013.01)

(58) Field of Classification Search
CPC .......... B41J 3/4075; B41J 3/46; B41J 2/3352; G06K 15/022; G06K 2215/0097; G06F 3/1204
USPC ........................................ 358/1.6
See application file for complete search history.

(56) References Cited

U.S. PATENT DOCUMENTS

| | | | |
|---|---|---|---|
| 2003/0081978 A1* | 5/2003 | Carriere ................. | B41J 3/4075 400/615.2 |
| 2006/0202800 A1* | 9/2006 | Ohashi ................. | G06K 7/0008 340/10.1 |
| 2008/0232886 A1* | 9/2008 | Kato ..................... | B41J 3/4075 400/76 |

FOREIGN PATENT DOCUMENTS

| | | |
|---|---|---|
| JP | H10-294920 A | 11/1998 |
| JP | 2000-076020 A | 3/2000 |
| WO | WO 2010/143224 A1 | 12/2010 |

* cited by examiner

*Primary Examiner* — Neil R McLean
(74) *Attorney, Agent, or Firm* — Scully, Scott, Murphy & Presser, P.C.

(57) ABSTRACT

The disclosure discloses a printer including a memory storing computer-executable instructions. When the instruction is executed by a processor, a printer perform a read process and a printed matter production process. In the read process, process setting information stored in a cartridge memory of a cartridge of the specific type is read, triggered by attachment of the cartridge of the specific type to a cartridge holder. In the printed matter production process, at least a feeder and a printing head is controlled on the basis of a setting state included in the process setting information read in the read process.

15 Claims, 13 Drawing Sheets

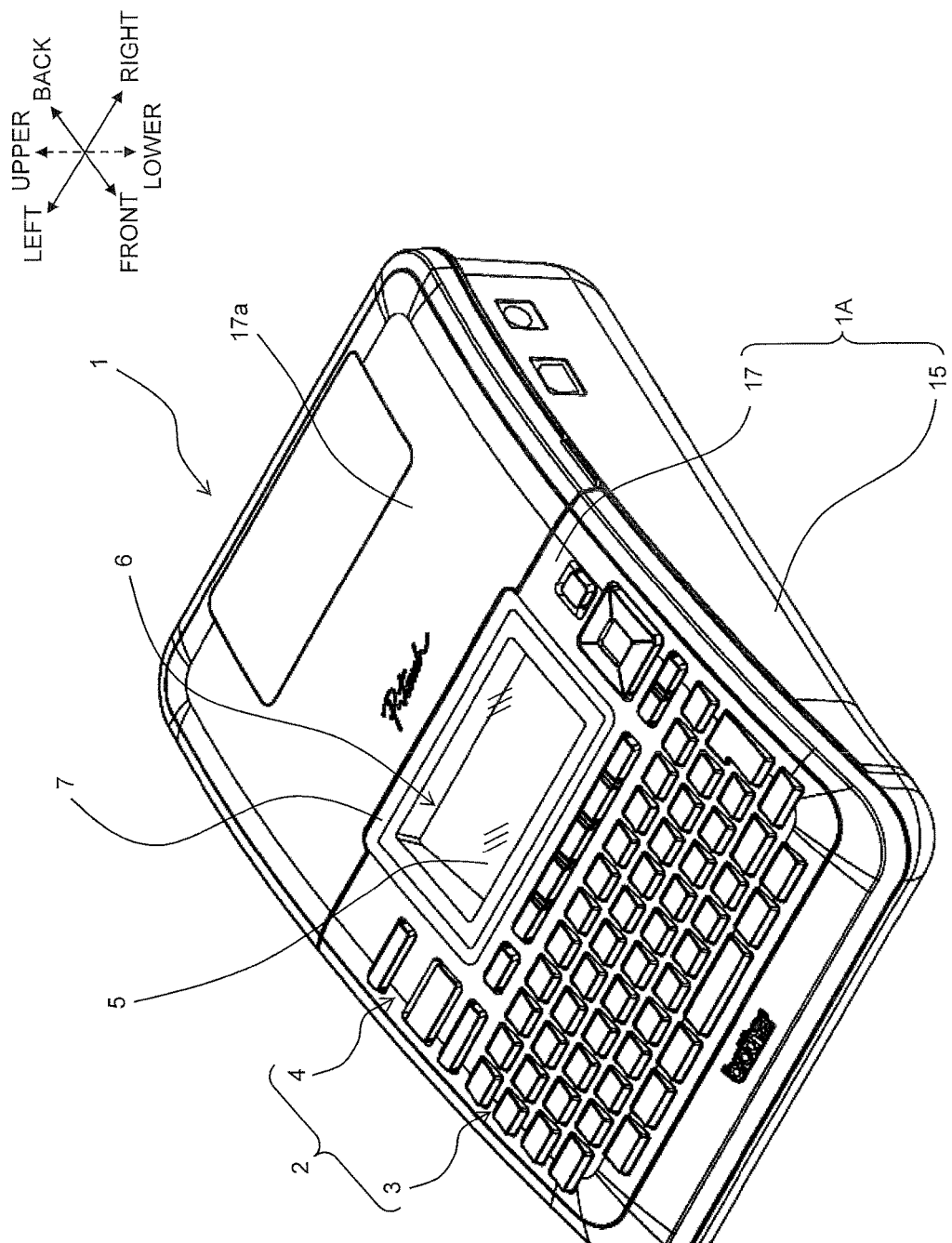
[FIG. 1]

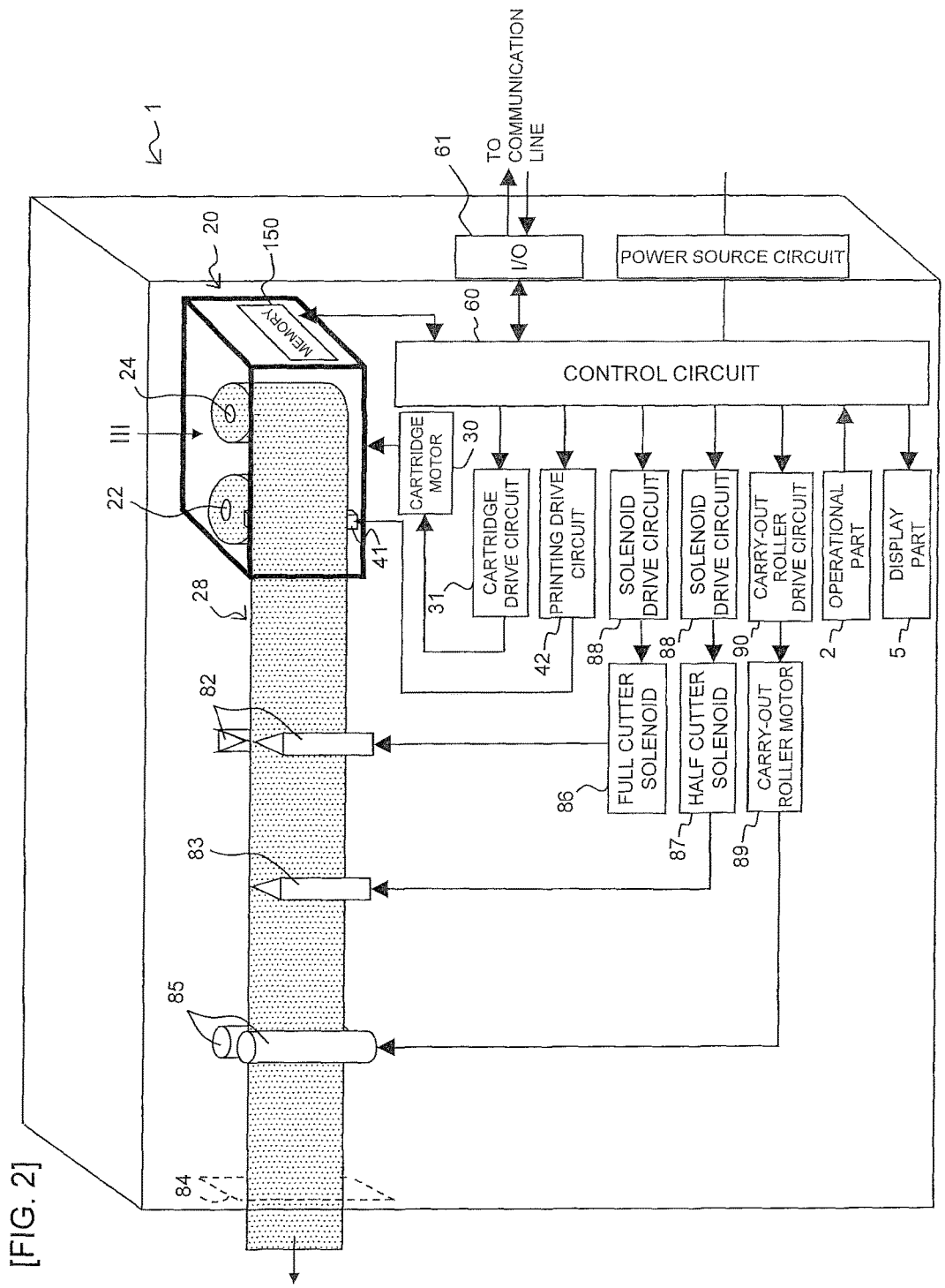
[FIG. 2]

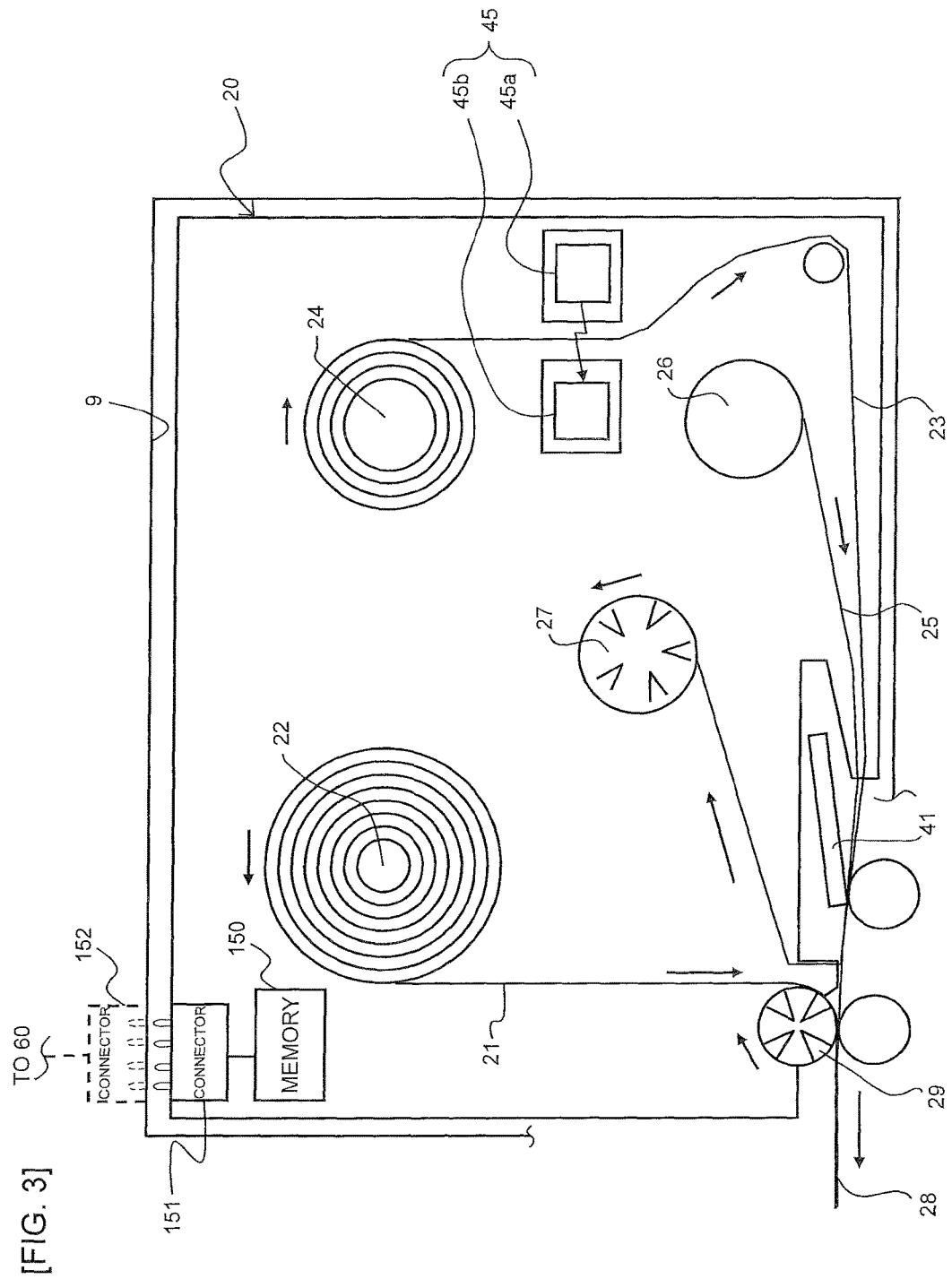
[FIG. 3]

[FIG. 4]

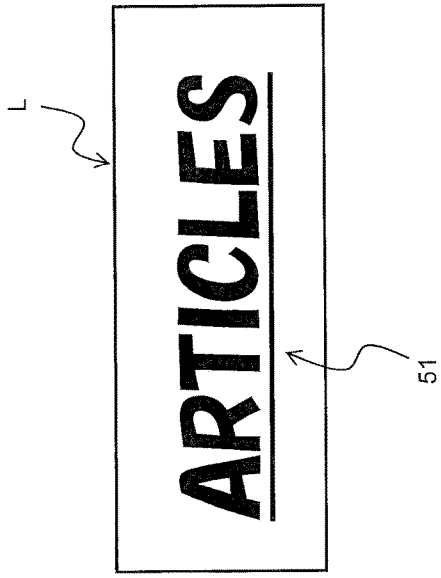

| PRINT TAPE SPECIFICATION | | |
|---|---|---|
| | TAPE WIDTH | 24mm |
| | TAPE COLOR | WHITE |

| PROCESS SETTING INFORMATION | |
|---|---|
| FONT SETTING | POP FONT, ** POINT |
| DECORATION SETTING | UNDERLINE |
| PRINTING DENSITY SETTING | PRINTING DENSITY SETTING |
| PRINTING SPEED SETTING | NORMAL SPEED |
| RESOLUTION SETTING | NORMAL RESOLUTION |
| TAPE MARGIN SETTING | START END: ** mm, TERMINAL END: ** mm |
| TEMPLATE SETTING | NONE |
| BAR CODE SETTING | NONE |
| CUTTING SETTING | FULL CUTTING |

| PRINT DATA |
|---|
| TEXT "ARTICLES" |

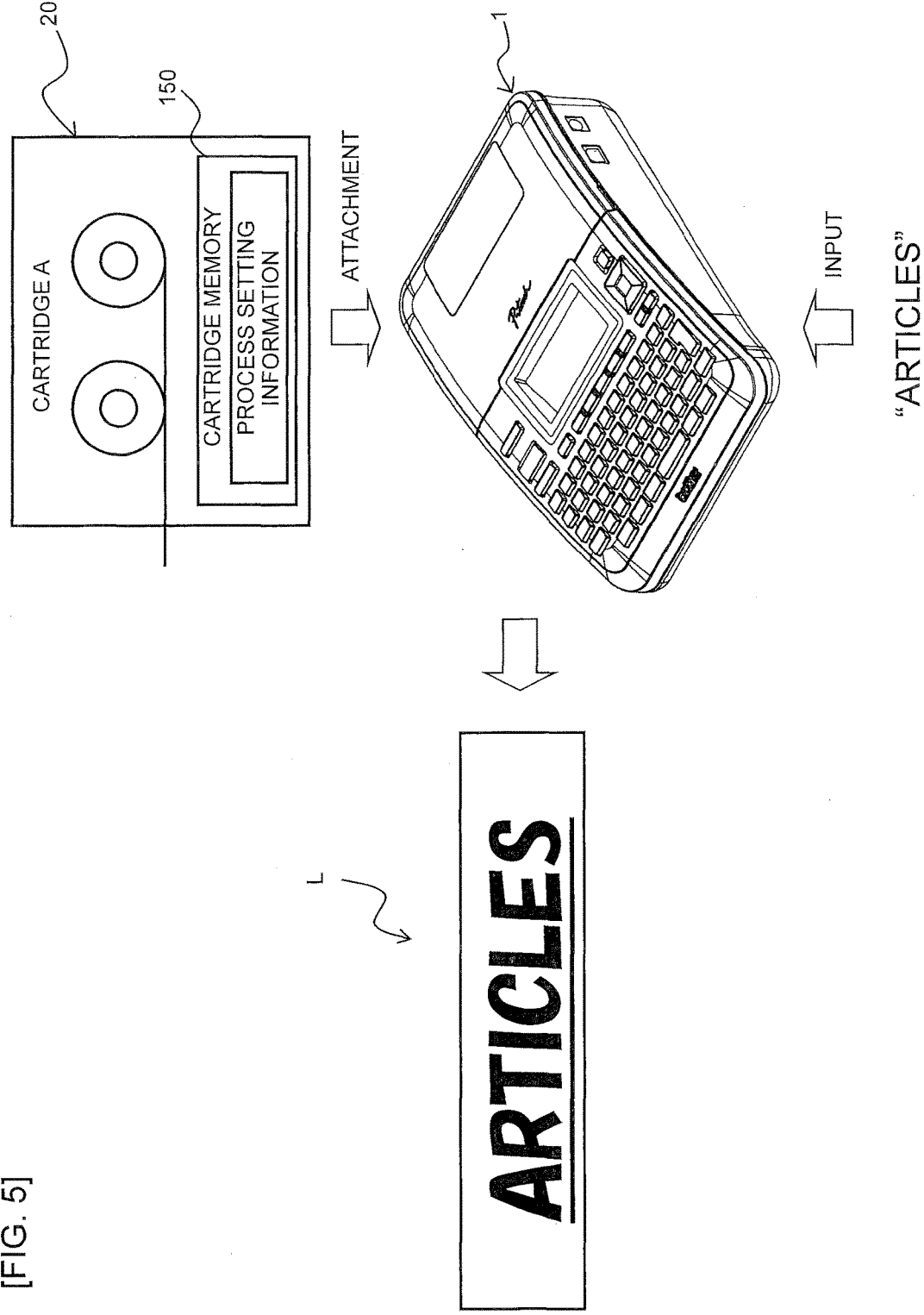

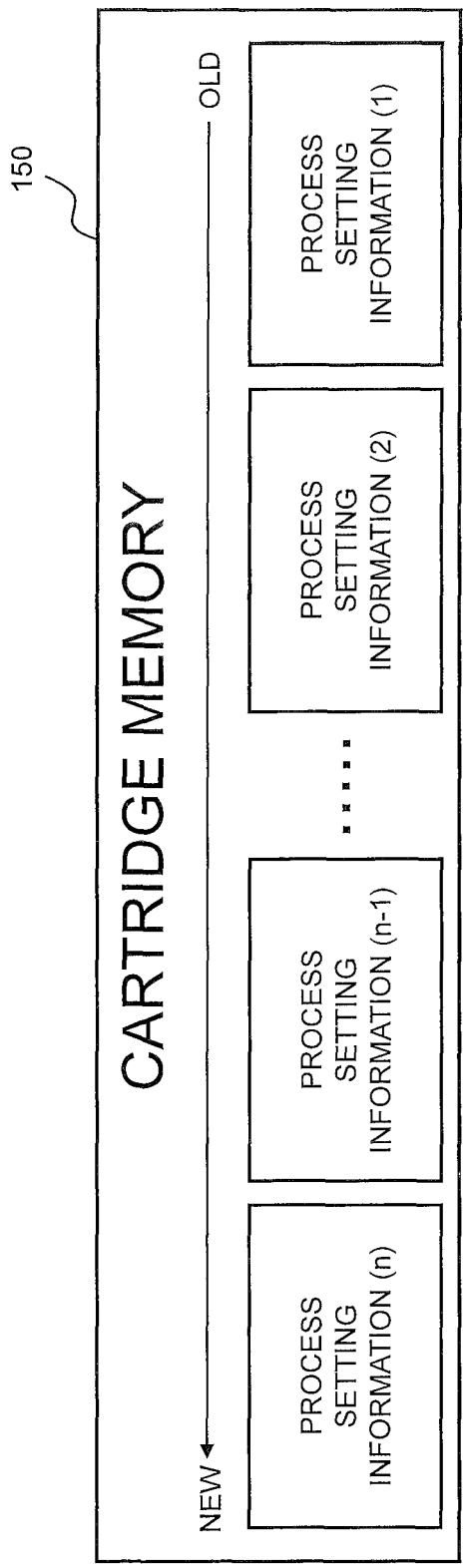
[FIG. 6]

[FIG. 7]

| INITIAL STATE PROCESS SETTING INFORMATION | |
|---|---|
| FONT SETTING | POP FONT, ** POINT |
| DECORATION SETTING | FRAME LINE |
| PRINTING DENSITY SETTING | MIDDLE DENSITY |
| PRINTING SPEED SETTING | NORMAL SPEED |
| RESOLUTION SETTING | NORMAL RESOLUTION |
| . . . | . . . |
| CUTTING SETTING | FULL CUTTING |

| PROCESS SETTING INFORMATION STATISTICS | | |
|---|---|---|
| FONT SETTING | GOTHIC FONT, ** POINT | 3 |
| | MINCHO FONT, ** POINT | 2 |
| | **POP FONT, ** POINT** | 7 |
| DECORATION SETTING | NONE | 2 |
| | UNDERLINE | 4 |
| | FRAME LINE | 6 |
| PRINTING DENSITY SETTING | HIGH DENSITY | 2 |
| | MIDDLE DENSITY | 9 |
| | LOW DENSITY | 1 |
| PRINTING SPEED SETTING | HIGH SPEED | 2 |
| | NORMAL SPEED | 10 |
| | LOW SPEED | 0 |
| RESOLUTION SETTING | HIGH RESOLUTION | 2 |
| | NORMAL RESOLUTION | 8 |
| | LOW RESOLUTION | 2 |
| . . . | . . . | . . . |
| CUTTING SETTING | FULL CUTTING | 10 |
| | PARTIAL CUTTING | 2 |

▢ : APPLIED SETTING STATES

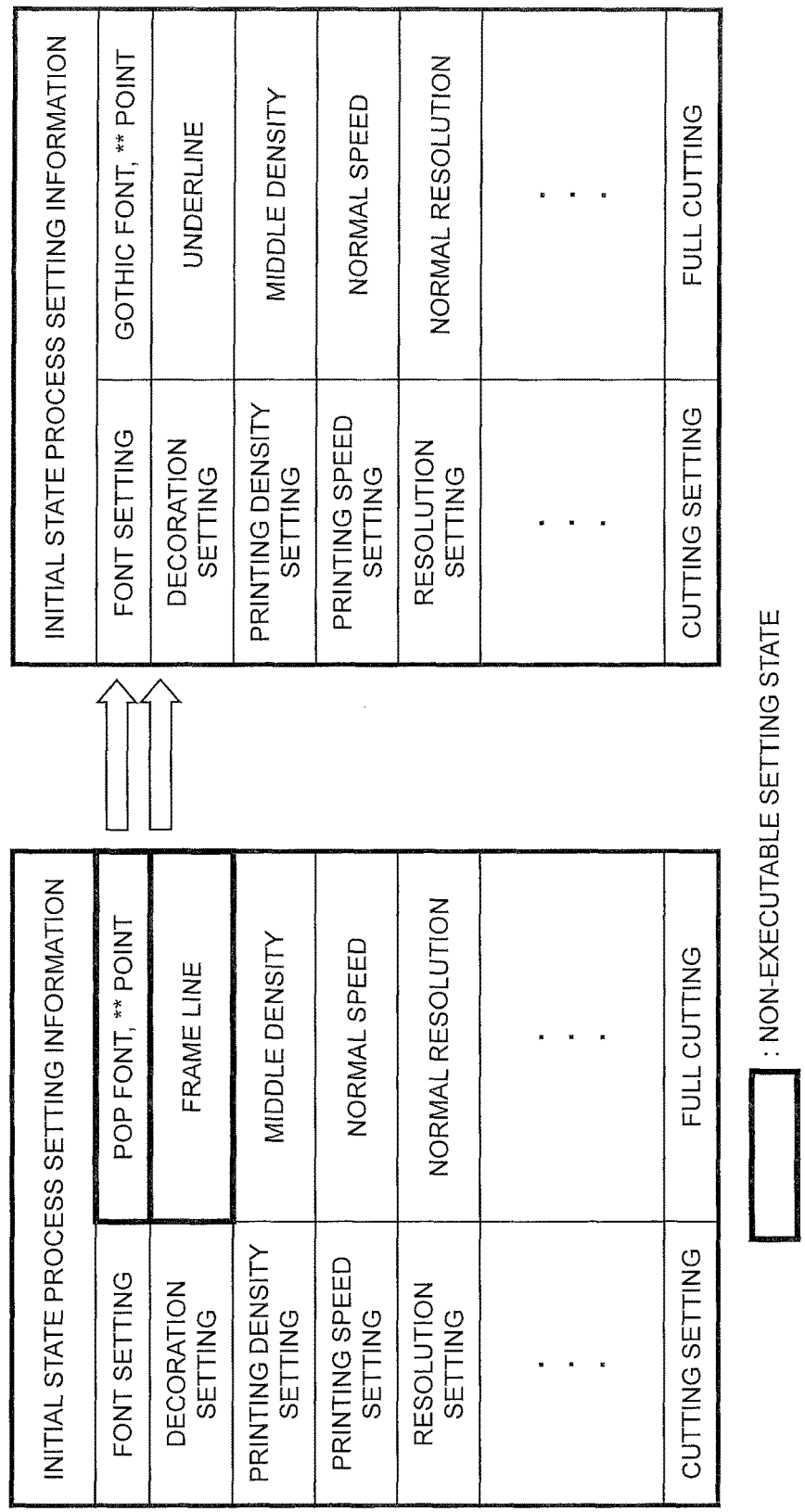
[FIG. 8]

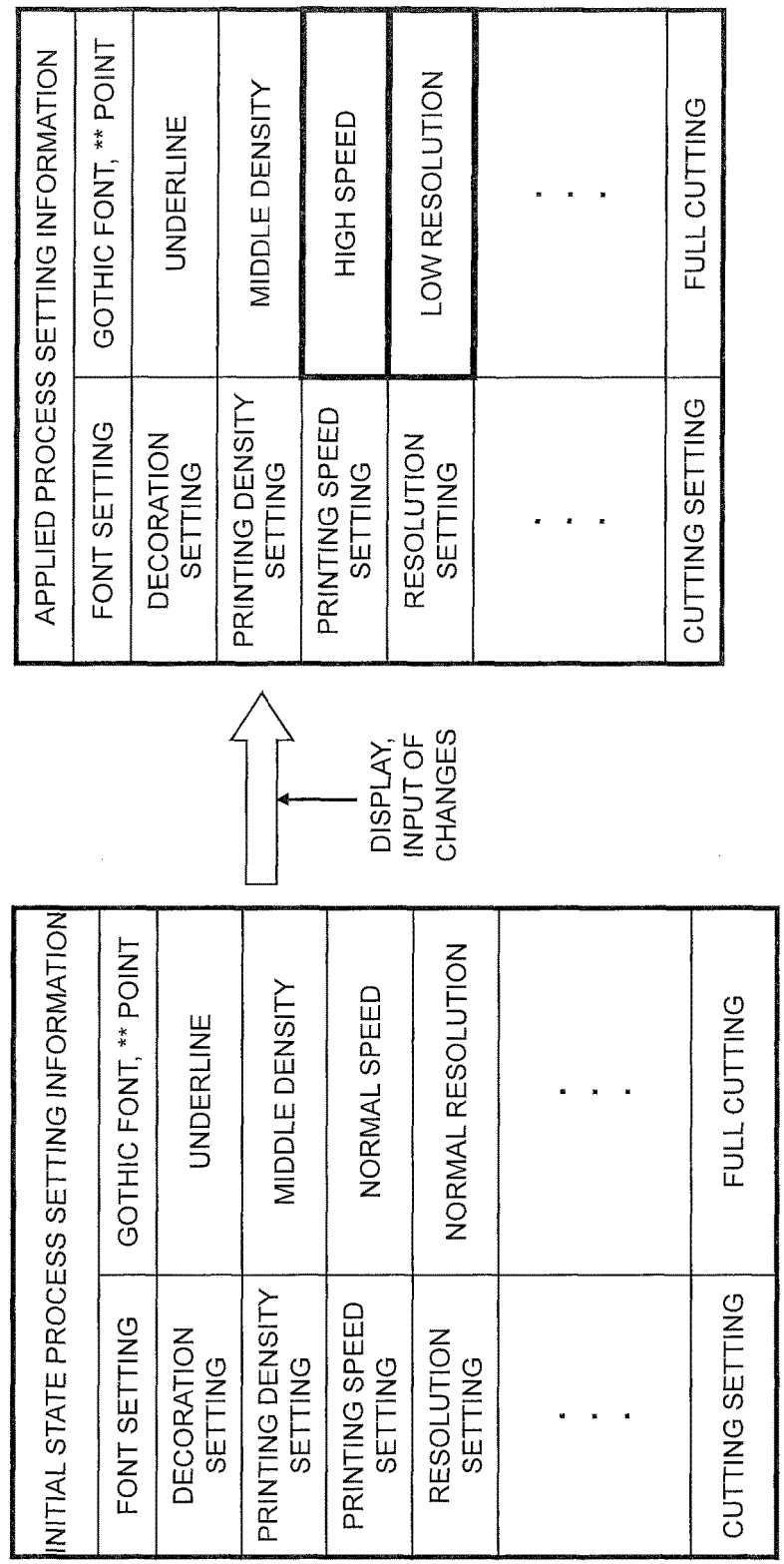
[FIG. 9]

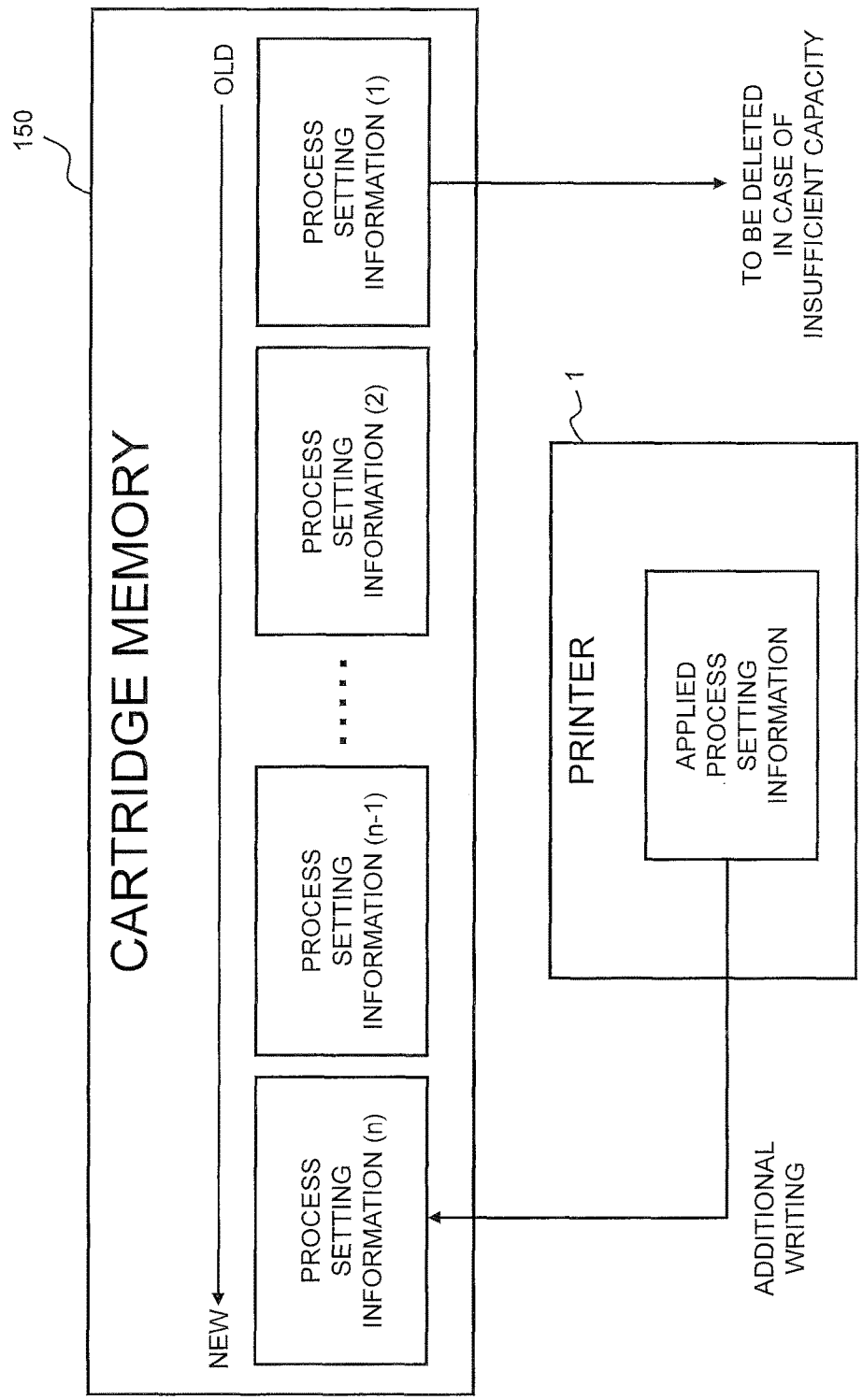

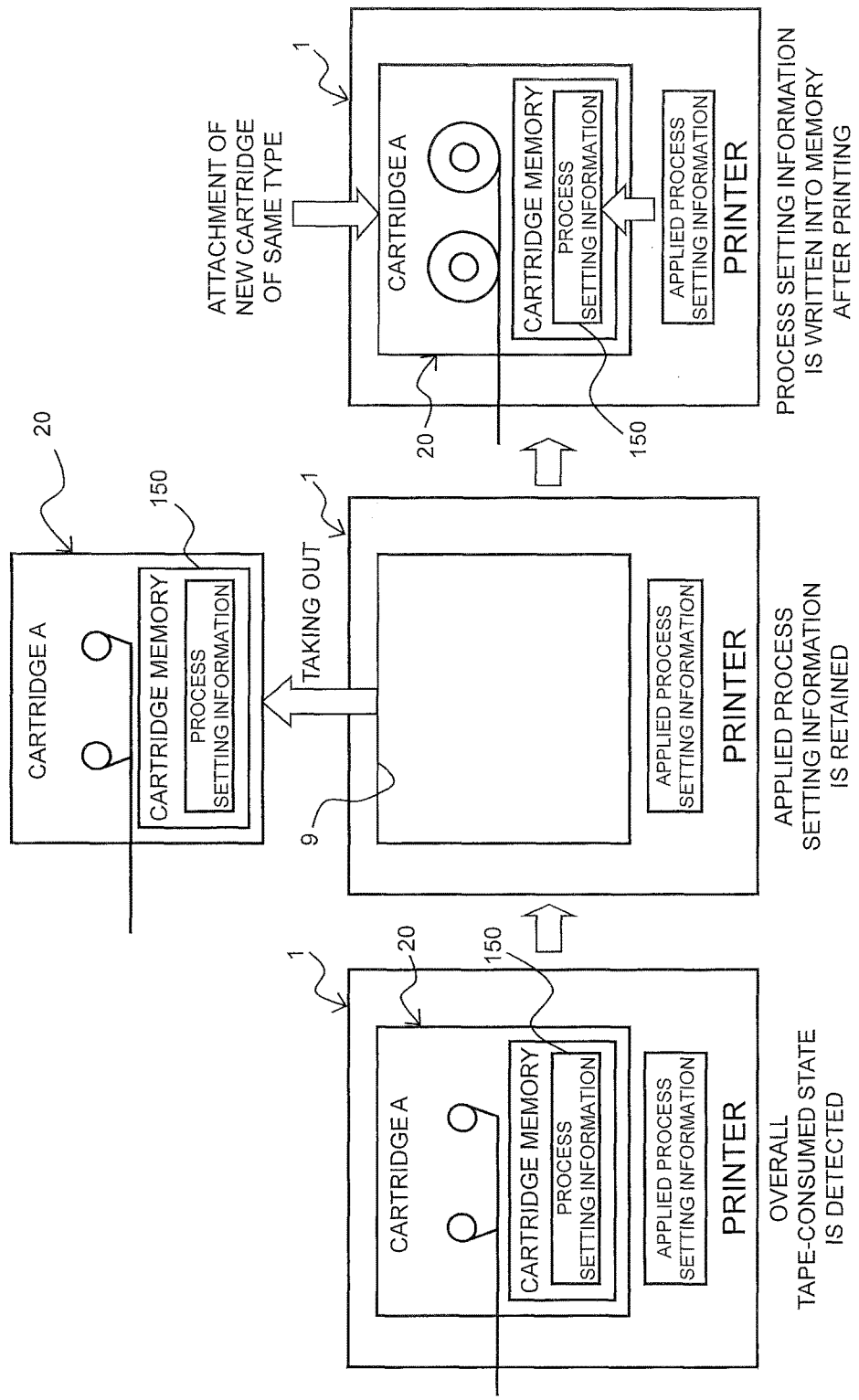
[FIG. 11]

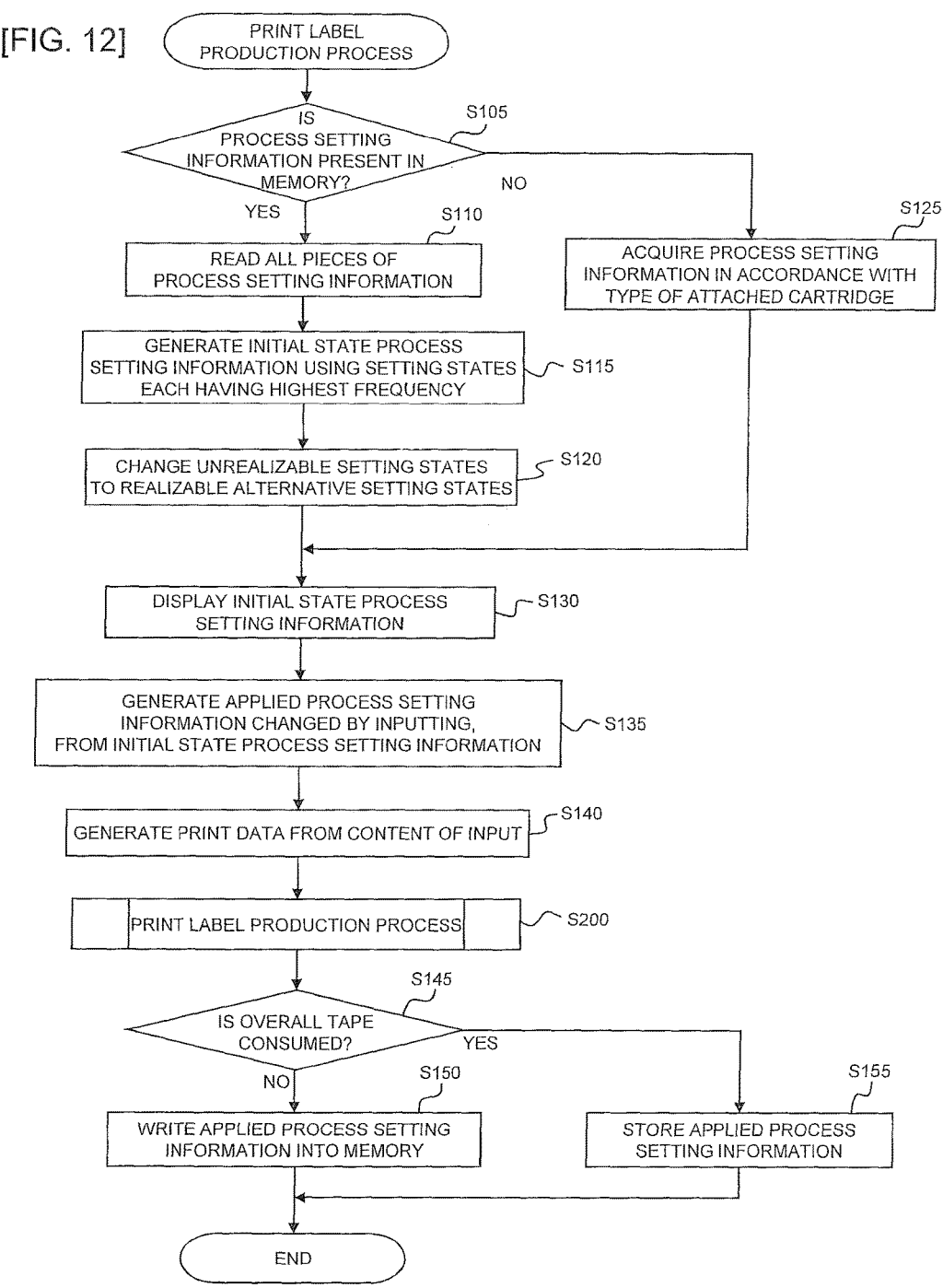

[FIG. 13]
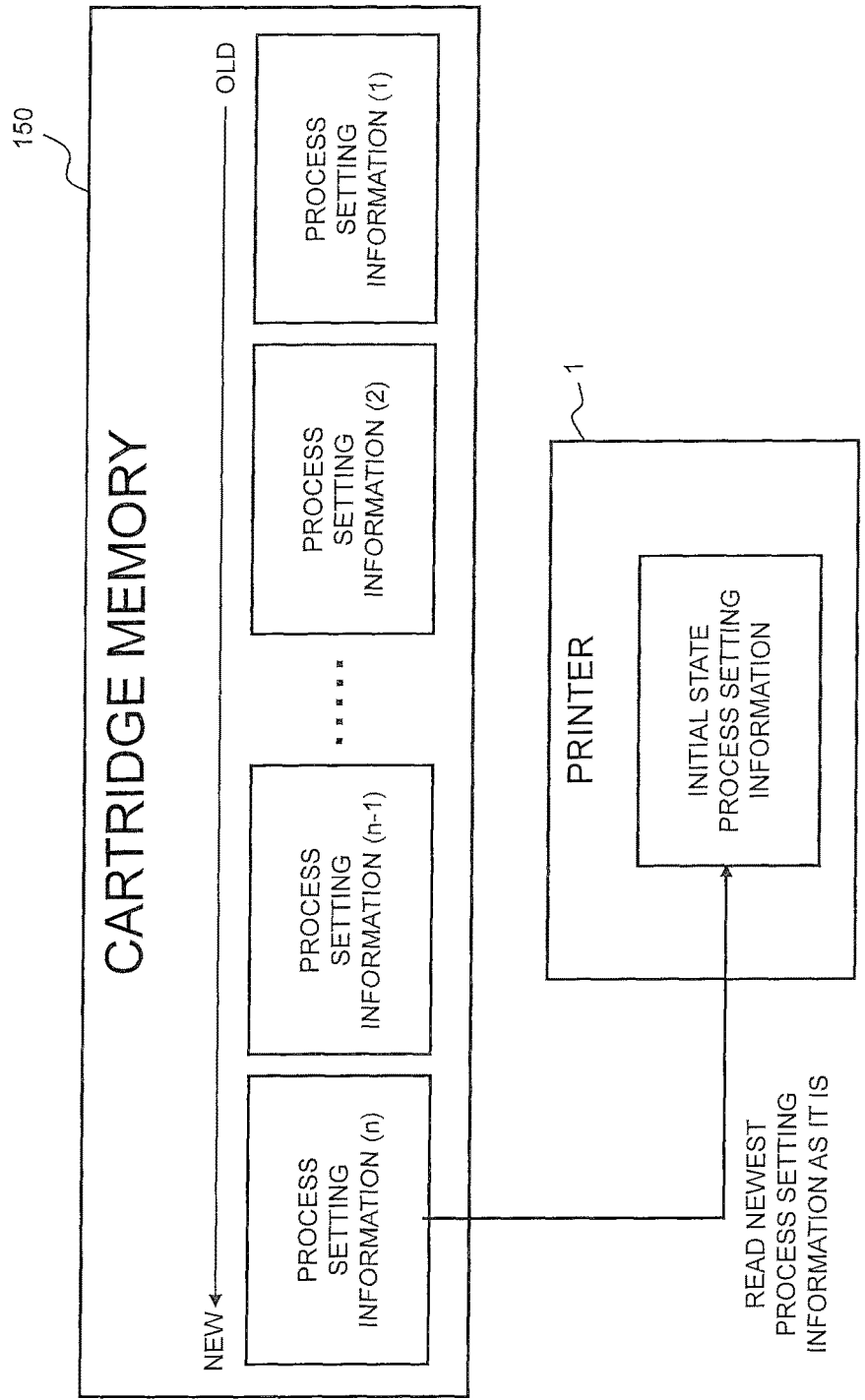

PRINTER

CROSS-REFERENCE TO RELATED APPLICATION

The present application claims priority from Japanese Patent Application No. 2017-061515, which was filed on Mar. 27, 2017, the disclosure of which is incorporated herein by reference in its entirety.

BACKGROUND

Field

This disclosure relates to a printer that executes a printed matter production process, and a recording medium.

Description of the Related Art

For example, a technique according to which a cassette memory is incorporated in a VTR tape cassette and text data having an arbitrary title in accordance with the content of an image recorded in the VTR tape cassette is recorded in the cassette memory to be displayed is known.

On the other hand, for a printer that produces a printed matter such as a print label, many forms of producing the printed matter by forming a print object on a print-receiving tape that is stored in a tape cartridge attached to the printer are also present. In a printed matter production process as this, the print object is usually formed in accordance with setting states arbitrarily determined for various setting items in relation to the printing mode. The case where a user uses different cartridges each for its suitable printing mode of the print object that is desired to be formed is present. In this case, when the printed matter production process is executed using one certain cartridge, the print object is formed with the above setting states that are always substantially same.

In the prior art, a memory incorporated in the cartridge however only has text data having the content to be printed or displayed recorded therein. As a result, when the cartridge is replaced with another one, the setting states of the various setting items in relation to the printing mode cannot be handed over to be reflected.

SUMMARY

An object of the present disclosure is to provide a printer and a recording medium that can improve the convenience for users by easily realizing the setting states regardless of the printer.

In order to achieve the above-described object, according to an aspect of the present application, there is provided a printer comprising a cartridge holder that a cartridge configured to supply a print-receiving medium is attached and detached, a feeder configured to feed a print-receiving medium supplied from the cartridge that is attached to the cartridge holder, a printing head configured to execute formation of a print object on the print-receiving medium fed by the feeder, a processor configured to control at least the feeder and the printing head to execute a printed matter production process for producing a desired printed matter, and a memory, and the cartridge of a specific type being attached to or detached from the cartridge holder, the cartridge of the specific type having a cartridge memory storing process setting information that comprises a setting state for at least one setting item in relation to the printed matter production process in a past executed by using the print-receiving medium in the cartridge, the memory storing computer-executable instructions that, when executed by the processor, cause the printer to perform a read process for reading the process setting information stored in the cartridge memory of the cartridge of the specific type, triggered by attachment of the cartridge of the specific type to the cartridge holder, and the printed matter production process for controlling at least the feeder and the printing head on the basis of the setting state included in the process setting information read in the read process.

BRIEF DESCRIPTION OF THE DRAWINGS

FIG. 1 is a perspective view showing an outer appearance of a print label producing device of an embodiment of the present disclosure.

FIG. 2 is a conceptual configuration view showing the detailed structure of the print label producing device.

FIG. 3 is an arrow view showing the detailed structure of a cartridge seen from a III direction in FIG. 2.

FIG. 4 is a view showing a production example of a print label and a table that collectively shows various types of information necessary for producing the print label.

FIG. 5 is a view showing a relation for transmission and reception of the various types of information during the production of the print label.

FIG. 6 is a view showing a retention mode of the process setting information in a cartridge memory.

FIG. 7 is a view showing an example of generation of initial state process setting information by collecting setting states each of the highest frequency.

FIG. 8 is a view showing an example of a change of unrealizable setting states to realizable setting states of initial state process setting information.

FIG. 9 is a view showing an example of generation of applied process setting information by an arbitrary change by inputting from the initial state process setting information.

FIG. 10 is a view showing an example of writing of the applied process setting information into the cartridge memory.

FIG. 11 is a view showing an example of retention and recording of the applied process setting information for the case where an overall tape-consumed state is detected.

FIG. 12 is a flowchart showing an example of control steps executed by a CPU of a control circuit 60 to realize a print label production process.

FIG. 13 is a view showing an example of the case where newest process setting information is established as the initial state process setting information.

DETAILED DESCRIPTION OF THE PREFERRED EMBODIMENTS

An embodiment of the present disclosure will be described with reference to the drawings.

<Configuration of Outer Appearance of Print Label Producing Device>

FIG. 1 shows a perspective view showing the outer appearance of a print label producing device of this embodiment. As shown in FIG. 1, a print label producing device 1 of this embodiment (corresponding to a printer) includes a housing 1A that constitutes the outer shell thereof. The housing 1A includes a lower cover 15 that is made from a resin and that constitutes the lower face of the device and the side face of the device, and an upper cover 17 that is made from a resin and that constitutes the upper face of the device.

The upper cover 17 includes a cartridge cover 17a that covers a cartridge holder 9 (see FIG. 3 described later), in the back portion side thereof. The cartridge cover 17a can be opened and closed around the back end portion as its fulcrum point. On the front portion side of the upper cover 17, an opening 6 that has, for example, a rectangular opening shape and that is adjacent to the cartridge cover 17a, and a transparent panel 7 that is attached to cover the opening 6 are disposed. On the inner side of the opening 6, a display part 5 including, for example, a liquid crystal display, to display thereon characters, symbols, and the like that are input thereinto is disposed. An operational part 2 is disposed around the opening 6. The operational part 2 has a keyboard 3 with which various operations such as inputting of characters are executed, and a functional key group 4 to cause various functions of the print label producing device 1 to be executed including keys such as a power source switch and a print key, arranged therein from a front direction toward a back direction of the upper cover 17. The display part 5 corresponds to an announcing device described in the appended claims and the operational part 2 corresponds to an operation device described in the appended claims.

Inside the housing 1A, for example, on the lower side of the display part 5, a main substrate that is not shown and that has electronic elements (such as an IC chip) constituting a control circuit 60 described later (see FIG. 2 described later) mounted thereon, and a key substrate that is not shown and that is connected to the control circuit 60 of the main substrate through a connector are disposed. The key substrate includes plural key contact points each disposed at a location corresponding to one of the keys that constitute the keyboard 3 and the functional key group 4. These key contact points are each closed when an operator operates a key of the keyboard 3 and the functional key group 4 and, as a result, the function assigned to the key is executed.

FIG. 2 shows a conceptual configuration view showing the detailed structure of the print label producing device 1. In FIG. 2, the print label producing device 1 includes a cartridge holder 9 to/from which a cartridge 20 configured for a base tape 21 and a cover film 23 (hereinafter, properly referred to collectively as "print tape") described later to be a print-receiving medium, to be able to sequentially be taken out is attached/detached (see FIG. 3 described later). The print label producing device 1 further includes a cartridge driving circuit 31, a printing driving circuit 42, and a control circuit 60 to control the operation of the overall print label producing device 1 through solenoid driving circuits 88, a feeding roller driving circuit 90, and the like described later.

The control circuit 60 is a what-is-called micro-computer and, though not shown in detail, includes a CPU to be a processor, a read only memory (ROM) as a recording medium, a random access memory (RAM), and the like, and is adapted to execute signal processing in accordance with programs stored in advance in the ROM using the temporary storage function of the RAM. The control circuit 60 has various types of information or instructions input thereinto from the operational part 2, and outputs various types of information to the display part 5 to be displayed thereon. The control circuit 60 is connected to a communication line not especially shown by an input/output interface 61 to be able to transmit and receive information with an information server not shown, another print label producing device, and the like.

The print label producing device 1 includes a cutter 82 that is disposed in the vicinity of an exit portion for the cartridge 20 and that is to cut off the label tape with print 28 in the thickness direction thereof (hereinafter, properly referred to as "overall cutting" or "full cutting"). On the downstream side of the cutter 82, a half cutter 83 to partially cut off the label tape with print 28 in the thickness direction thereof (hereinafter, properly referred to as "semi-cutting" or "half cutting") is disposed. The cutter 82 corresponds to a cutter described in the appended claims and the half cutter 83 corresponds to a half-cutter described in the appended claims.

The cutter 82 and the half cutter 83 are respectively driven by a full cutter solenoid 86 and a half cutter solenoid 87 to each execute a cutting operation. The full cutter solenoid 86 and a half cutter solenoid 87 are each controlled by a solenoid driving circuit 88. The carry-out roller 85 is driven by a carry-out roller motor 89 and this motor 89 is controlled by the carry-out roller driving circuit 90.

FIG. 3 is an arrow view showing the detailed structure of the cartridge 20 seen from a III direction in FIG. 2.

In FIG. 3 and FIG. 2 described above, in the cartridge 20, a first roll having a belt-like base tape 21 wound therein, a second roll 24 having a transparent cover film 23 whose width is substantially equal to that of the base tape 21 wound therein, an ink ribbon roll 26 having an ink ribbon 25 for printing wound therein, a take-up roller 27 to take up the ink ribbon 25 after the printing, and a pressure bonding roller 29 that presses the base tape 21 and the cover film 23 to each other to be bonded to each other to form a label tape with print and that concurrently feeds the bonded tape in a direction indicated by an arrow are disposed each to be rotatable around its shaft center. Of these, the take-up roller 27 and the pressure boding roller 29 are each driven to be rotated by the driving force of a cartridge motor 30 (see FIG. 2) that is disposed outside the cartridge 20 and that is, for example, a pulse motor. The driving of the cartridge motor 30 is controlled by a cartridge driving circuit 31 (see FIG. 2). The pressure bonding roller 29 corresponds to a feeder described in the appended claims.

The ink ribbon roller 26 and the take-up roller 27 are disposed on the back face side of the cover film 23, that is, the side to be bonded to the base tape 21. In this case, a thermal head 41 that is energized by a printing drive circuit 42 (see FIG. 2) to execute printing for the cover film 23 is disposed in the vicinity of the cartridge 20. The ink ribbon 25 is pressed to the thermal head 41 and, as a result, is abutted to the back face of the cover film 23.

In this configuration, the take-up roller 27 and the pressure bonding roller 29 are caused to rotate being synchronized with each other in the direction indicated by an arrow by the driving of the cartridge motor 30, and plural heat generating elements of the thermal head 41 are energized by the printing drive circuit 42. As a result, on the back face of the cover film 23, a print object 51 such as a desired character, symbol, bar code, or the like (see FIG. 4 described later) is printed (and the character or the like to however be s mirror-symmetrical one when seen from the side of the print is printed because the printing is executed on the back side). After this printing, the cover film 23 is bonded to the base tape 21 by the pressure bonding roller 29 and, as a result, a label tape with print 28 is formed to be discharged to the exterior of the cartridge 20. The thermal head 41 corresponds to a printing head described in the appended claims.

In the cartridge holder 9, a tape end sensor 45 not shown in FIG. 2, that executes optical sensing in a feeding path of the cover film 23 fed out from the second roll 24 is disposed. The cover film 23 wound in the second roll 24 usually includes a material that has translucency while the vicinity of a terminal end thereof is colored to block any transmission of light. Consumption of the overall tape of the overall cartridge 20 (an overall medium-consumed state) can be detected when the tape end sensor 45 including a light emitter 45*a* and a light receiver 45*b* arranged to sandwich the cover film 23 cannot receive any light in the vicinity of the terminal end of the cover film 23. The tape end sensor 45 corresponds to a detector described in the appended claims.

For the above basic configuration, the most significant feature of the print label producing device 1 of this embodiment is that a readable/writable cartridge memory (referred to simply as "memory" in FIGS. 2, 3) 150 having process setting information (described later) in relation to the printing mode stored therein is disposed in the cartridge 20. For example, a non-volatile storage device such as a flash memory is used as the cartridge memory 150. A connector 151 connected to the cartridge memory 150 is disposed in the cartridge 20, and a connector 152 connected to the control circuit 60 and capable of being fitted with and detached from the connector 151 is disposed on the side of the main body of the print label producing device 1.

<Various Types of Information Necessary for Production of Print Label>

FIG. 4 collectively shows a production example of the print label and the various types of information necessary for producing the print label. A print label L (a printed matter) of the shown example is formed by printing print data of "一般備品" in a pop font style with an underline on the print tape having a tape width of 24 mm and having a white background.

To produce the print label L using the print label producing device 1 (hereinafter, referred to properly as "printer" in the drawings), three types of information of the print tape specification, the process setting information, and the print data are mainly necessary. The print tape specification refers to the specification of the print tape itself (the base tape 21 and the cover film 23) and, in this case, includes two pieces of information of the tape width and the tape color. The tape width and the tape color are fixedly determined in advance for the print tape to be stored in the cartridge 20.

The process setting information refers to the information in relation to the printing mode of the print data, the cutting mode of the label tape with print 28, and the like for producing the print label L. The process setting information of the shown example includes information on the setting state in accordance with at least one setting item of the font setting, the decoration setting, the printing density setting, the printing speed setting, the resolution setting, the tape margin setting, the template setting, the bar code setting, and the cutting setting.

The font setting refers to the setting of the font (the style) and the size (point) for characters in the case where the print data to be printed is text data. The decoration setting refers to the setting of an underline, a frame line, and the like to additionally decorate the print data. The printing density setting, the printing speed setting, and the resolution setting are the settings in relation to the printing density, the printing speed, and the resolution for the printing using the thermal head 41 onto the cover film 25. The tape margin setting is the setting as to what size of margin is disposed on each of the start end side and the terminal end side (in addition, the upper edge side and the lower edge side) for the print of the print data. The template setting is the setting in relation to the presence or the absence, and selection of a template to be referred to when the print object 51 is generated. The bar code setting is the setting in relation to the presence or the absence, and selection of a bar code that indicates predetermined information as the print object 51. The cutting setting is the setting for selecting the overall cutting by the cutter 82 or the partial cutting by the half cutter 83 for cutting off the label tape with print 28. The setting states of these setting items are pieces of information to be arbitrarily selected on the basis of the use of the print label L to be produced and the taste of the user.

The print data is the data of a text or a figure as the content of the print object 51 to be printed on the print tape, is input from the operational part 2 or another information device for each print label L to be produced, and is received.

When the print label L is produced using the print label producing device 1 of this embodiment, as shown in FIG. 5, the cartridge 20 in accordance with the print tape specification of the print label L to be produced is selected and the process setting information is stored in the cartridge memory 150 in the cartridge 20. When the cartridge 20 is attached, the process setting information stored in the cartridge memory 150 is read and the print data is input through the operational part 2 or the like. As a result, using the print tape of the print tape specification stored in the cartridge 20, the input print data is printed in the mode of the process setting information read from the cartridge memory 150, to be able to produce the print label L.

<Handling of Process Setting Information>

FIG. 6 shows a retention mode of the process setting information in the cartridge memory 150. In the cartridge memory 150, plural pieces of process setting information applied to the production of the print labels L using the cartridge 20 in the past are recorded in order of their application sequence from the oldest one to the newest one (in FIG. 6, the order of (1) to (n)).

In the example of this embodiment, when the cartridge 20 is attached, all the pieces of process setting information stored in the cartridge memory 150 are read. As shown in FIG. 7, when plural setting states having frequencies each different from each other are present for each of the setting items, the setting state having the highest frequency is applied with priority and the applied setting states are collectively handled as "initial state process setting information" (on the right side in FIG. 6).

The print label producing device 1 has plural device models, and realizable setting states and unrealizable setting states may be present depending on the specification of the device model. As a result, as shown in FIG. 8, of the setting states included in the initial state process setting information, the setting states unrealizable by the print label producing device 1 to be used (in the shown example, "pop font" of the font setting and "frame line" of the decoration setting) are alternatively changed to the setting states realizable by this print label producing device 1 (in the shown example, "gothic font" of the font setting and "underline" of the decoration setting). The process for the CPU to determine whether a setting state is realizable or unrealizable in this case corresponds to a determination process described in the appended claims.

The initial state process setting information set as above is displayed on the display part 5 to be announced to the user and this is not especially shown. The displayed initial state process setting information is the process setting information that collectively includes the setting states that each have high frequency of being selected in the past and that are realizable by this print label producing device 1, for a print tape having the tape width and the tape color of the print tape stored in the cartridge 20. As shown in FIG. 9, the user further makes changes for setting items to arbitrary setting states from those in the initial state process setting information (in the shown example, changes are made for the printing speed setting to "high speed" and for the resolution setting to "low resolution") by executing a proper input operation on the operational part 2. As a result, the applied process setting information to be applied to the production of the print label L for this time is generated.

The print data input by another input operation on the operational part 2 is printed on the basis of the applied process setting information to produce the print label L. When the print label L is produced in this manner, triggered by this production, the applied process setting information is newly written into the cartridge memory 150. As to the writing of this applied process setting information, as shown in FIG. 10, the applied process setting information to be written is additionally written into the cartridge memory 150 as the newest one. When the capacity of the cartridge memory 150 is insufficient, the oldest process setting information is deleted to secure the storage area.

In the case where the tape end sensor 45 detects the overall tape-consumed state in the cartridge 20, as shown in FIG. 11, even after the cartridge 20 is taken out after the production of the print label L, the applied process setting information is recorded in a proper storage part such as, for example, the RAM in the print label producing device 1 to be stored.

Many common print label producing devices 1 each enable plural types of cartridge 20 each storing therein one of print tapes having various tape widths and various tape colors, to be attached thereto. As a result, in the case where a new cartridge 20 whose cartridge memory 150 has nothing recorded therein as the process setting information is attached thereto, when the applied process setting information in accordance with the type (a specific type; in the shown example, "cartridge A") of the cartridge 20 is recorded in the storage part in the print label producing device 1, the print label L is produced using this applied process setting information as the initial state process setting information. After the production of the print label L, the applied process setting information is written into the cartridge memory 150.

<Control Steps>

FIG. 12 shows an example of the control steps executed by the CPU of the control circuit 60 to realize the print label production process. The flow in FIG. 12 is started at the time when the cartridge 20 is attached to the print label producing device 1.

At step S105, the CPU of the control circuit 60 determines whether the process setting information is recorded in the cartridge memory 150 (referred to simply as "memory" in FIG. 12). In other words, the CPU determines whether the attached cartridge 20 is a new one. When the process setting information is already recorded in the cartridge memory 150, the determination is satisfied (S105:YES) and the control step moves to step S110.

At step S110, the CPU of the control circuit 60 reads all the pieces of process setting information recorded in the cartridge memory 150.

The control step moves to step S115, and the CPU of the control circuit 60 collects the setting states selected on the basis of the highest frequency for each of the setting items, from all the pieces of process setting information read at step S110 to generate the initial state process setting information.

The control step moves to step S120, and the CPU of the control circuit 60 alternatively changes the setting states unrealizable by the print label producing device 1 from the initial state process setting information generated at step S115, to the setting states realizable thereby. The control step moves to step S130.

In the determination at step S105, when the CPU determines that no process setting information is recorded in the cartridge memory 150, the determination is not satisfied (S105:NO) and the control step moves to step S125.

At step S125, the CPU of the control circuit 60 acquires the process setting information in accordance with the type of the attached cartridge 20 from the storage part in the print label producing device 1 and sets the acquired process setting information to be the initial state process setting information. When the pertinent process setting information is not present in the storage part, the CPU sets the default process setting information determined separately, to be the initial state process setting information. The control step moves to step S130.

At step S130, the CPU of the control circuit 60 displays the initial state process setting information at this time point, on the display part 5.

The control step moves to step S135 and the CPU of the control circuit 60 properly changes the initial state process setting information on the basis of the content of an input through the operational part 2 to generate the applied process setting information.

The control step moves to step S140 and the CPU of the control circuit 60 generates the print data on the basis of the content of the input through the operational part 2.

The control step moves to step S200 and the CPU of the control circuit 60 prints the print data generated at step S140 in the mode of the applied process setting information generated at step S135, using the print tape stored in the cartridge 20 to produce the print label L.

The control step moves to step S145 and the CPU of the control circuit 60 determines whether any overall tape-consumed state is detected from the tape end sensor 45. When the CPU determines that the overall tape-consumed state is not detected, the determination is not satisfied (S145:NO) and the control step moves to step S150.

At step S150, the CPU of the control circuit 60 additionally writes the applied process setting information generated at step S135 into the cartridge memory 150. The CPU causes this flow to come to an end.

On the other hand, when the CPU determines in the determination at step S145 that the overall tape-consumed state is detected, the determination is satisfied (S145:YES) and the control step moves to step S155.

At step S155, the CPU for the control records the applied process setting information generated a step S135 in the storage part for retention thereof. The CPU causes this flow to come to an end.

In the above, the step of step S200 in FIG. 12 corresponds to a control step and a printed matter production process described in the appended claims, the step of step S110 corresponds to a read step and a read process described in the appended claims, the steps of steps S115, S120 correspond to an initial setting process described in the appended claims, and the step of step S150 corresponds to a write process described in the appended claims.

As above, in the print label producing device 1 in this embodiment, the cartridge memory 150 is disposed in a specific type of cartridge 20 and the cartridge memory 150 has the processing setting information stored therein (including the setting states of the various setting items such as the font setting, the decoration setting, the printing density setting, the printing speed setting, the resolution setting, the margin setting, the template setting, the bar code setting, the cutting setting, and the like) in relation to the print label production processes in the past. The stored processing setting information is read at the control step of step S110 in the state where the cartridge 20 of the specific type is attached to the cartridge holder 9 included in the print label producing device 1. The pressure bonding roller 29 and the thermal head 41 are controlled on the basis of the setting states included in the read processing setting information, to execute the print label production process for this time.

In this embodiment, especially, when the processing setting information is read at the control step of step S110, the initial states of the setting items (the initial state processing setting information) in the print label production process subsequently executed is set in accordance with the setting states of the setting items included the read processing setting information, at the control steps of steps S115, S120.

In this embodiment, especially, when plural setting states having frequencies each different from each other are present for one setting item included in the read processing setting information, at the control step of step S115, at least one initial state (the initial state "a" having the highest frequency, the initial state b having second highest frequency, and so on) of the one setting item is set putting priority on the setting state having a high frequency. As a result, even when plural setting states for the same one setting item are present in the history of the past, the setting state in accordance with a history having a high frequency is automatically set to be the initial setting state (see FIG. 7).

In the embodiment, especially, the print label producing device 1 includes the display part 5 that announces the set initial state processing setting information (see also step S130).

In this embodiment, especially, in the case where it is attempted to automatically realize the optimal setting states in accordance with the history of the past as above, when the setting states in the processing setting information stored in the cartridge memory 150 cannot be executed as they are due to limitation by the specification on the side of the print label producing device 1, the setting states equivalent to these setting states can instead be realized (see FIG. 8).

In this embodiment, especially, the print label producing device 1 further includes the operational part 2 that can be operated to change the initial state processing setting information set at the control step of step S115 and, in the print label production process, at least the pressure bonding roller 29 and the thermal head 41 are controlled on the basis of the initial state processing setting information reflecting the change operation on the operational part 2.

In this embodiment, especially, after the processing setting information is read at the control step of step S110, triggered by the execution of the print label production process as a result of controlling the pressure bonding roller 29 and the thermal head 41, the applied processing setting information (including the setting information for at least one setting item) in relation to the print label production process is written into the cartridge memory 150 at the control step of step S150. As to the writing of the applied processing setting information into the cartridge memory 150, in addition to the writing immediately after the print label production process, for example, the applied processing setting information may collectively be written when the power source of the print label producing device 1 is finally turned off, or may collectively be written when the cartridge cover 17a is opened and before the cartridge 20 is taken out.

In this embodiment, especially, the tape end sensor 45 is disposed and, as a result, in the case where the print label production process is executed with the cartridge 20 attached to the cartridge holder 9, when the print tape in the cartridge 20 is fully consumed to establish the overall tape-consumed state, this can be detected. When the overall tape-consumed state is established, the user usually takes off the cartridge 20 from the cartridge holder 9 and subsequently attach newly a cartridge 20 of the same type to continue the production of the print label L in the same mode.

In this embodiment, in the print label production process, using the setting states in the print label production process executed before the overall tape-consumption state is established (for example, storing the setting states once in the storage part disposed in the print label producing device 1 and reading the setting states after the replacement of the cartridge 20 to be used), the pressure bonding roller 29 and the thermal head 41 are controlled to execute the print label production process on the basis of the new cartridge 20.

In this embodiment, especially, the setting items includes at least one of the font setting, the decoration setting, the printing density setting, the printing speed setting, the resolution setting, the tape margin setting, the template setting, and the bar code setting that are used when the thermal head 41 forms the print object 51.

In the embodiment, especially, the print label producing device 1 includes the cutter 82 that totally cuts the label tape with print 28 in the thickness direction thereof and the half cutter 83 that partially cuts the label tape with print 28 in the thickness direction thereof. The setting items includes the cutting setting that indicates the overall cutting by the cutter 82 or the half cutting by the half cutter 83.

The present disclosure is not limited to the embodiment and various modifications can be made thereto within the scope not departing from the gist and the technical idea thereof. Such modification examples will sequentially be described below. In the modification examples, the components equivalent to those of the embodiment will be given the same reference numerals and will not again be described or will simply be described.

(1) Case where Newest Process Setting Information is Set to be Initial State Process Setting Information All the pieces of process setting information recorded in the cartridge memory 150 are read and the setting states having the highest frequencies each for one of the setting items are collectively set to be the initial state process setting information in the embodiment while the setting of information is not limited to this. As shown in FIG. 13, when plural setting states having dates and times of execution sessions each different from each other are present for one setting item included in the read process setting information, at least one initial state of the one setting item may be set putting priority on the setting state whose date and time of execution are new.

As a result, in the history of the past, even when plural setting states are present for one same setting item, a relatively recent setting state is automatically set to be the initial setting state.

(2) Others

The above has been described taking examples of the case where the print tape is wound around a reel member to constitute the tape roll and the case where this tape roll is disposed in the cartridge 20 and the print tape is fed out while the tape roll configuration is not limited to this. For example, long-length flat paper sheet-like or strip-like tapes or sheets (including those each formed by feeding out the tape wound in the tape roll and subsequently cutting the tape to have a proper length) are stacked on each other in a predetermined storage part (for example, flatly stacked on each other in layers in a tray-like article) to form a cartridge. The print label L may be produced by attaching this cartridge to the cartridge holder on the side of the print label producing device 1, executing transporting and feeding from the storage part, and executing printing and writing.

In the above description, "perpendicular" is not perpendicular in a strict meaning. This "perpendicular" means "substantially perpendicular" allowing the tolerance and the error relating to the design and the production.

In the above description, "parallel" is not parallel in a strict meaning. This "parallel" means "substantially parallel" allowing the tolerance and the error relating to the design and the production.

In the above description, "equal" has no strict meaning. This "equal" means "substantially parallel" allowing the tolerance and the error relating to the design and the production.

In the above, arrows shown in FIG. 1, FIG. 2, and the like each indicate an example of the flow of the signal and each do not limit the direction of the flow of the signal.

The flowcharts shown in FIG. 12 and the like each do not limit the present disclosure to the steps shown in these flows, and any addition/deletion to/from, any change of order, or the like of the steps may be made within the scope not departing from the gist and the technical idea of the present disclosure.

In addition to the above, the techniques in accordance with the embodiment and the modification examples may be used properly in combination.

In addition, though not specifically exemplified, the present disclosure is implemented with various changes made thereto within the scope not departing from the gist thereof.

What is claimed is:

1. A printer comprising:
    a cartridge holder that a cartridge configured to supply a print-receiving medium is attached and detached;
    a feeder configured to feed said print-receiving medium supplied from said cartridge that is attached to said cartridge holder;
    a printing head configured to execute formation of a print object on said print-receiving medium fed by said feeder;
    a processor configured to control at least said feeder and said printing head to execute a printed matter production process for producing a desired printed matter; and
    a memory, and
    said cartridge of a specific type being attached to or detached from said cartridge holder,
    said cartridge of the specific type having a cartridge memory storing process setting information that comprises a setting state for at least one setting item in relation to said printed matter production process in a past executed by using said print-receiving medium in said cartridge,
    said memory storing computer-executable instructions that, when executed by said processor, cause said printer to perform:
    a read process for reading said process setting information stored in said cartridge memory of said cartridge of said specific type, triggered by attachment of said cartridge of said specific type to said cartridge holder; and
    said printed matter production process for controlling at least said feeder and said printing head on the basis of said setting state included in said process setting information read in said read process, wherein
    said memory stores said instructions that, when executed by said processor, cause said printer to further perform
    when said process setting information is read in said read process, in accordance with said setting state of said setting item included in the process setting information read, an initial setting process for setting an initial state of said setting item in said printed matter production process executed thereafter, and wherein
    in the case that plural setting states having frequencies each different from each other in one said setting item included in said process setting information read are present, at least one said initial state in said one setting item is set while putting priority on said setting state having a high frequency in said initial setting process.

2. The printer according to claim 1, wherein
said memory stores said instructions that, when executed by said processor, cause said printer to further perform
an announcement process for announcing said initial state set in said initial setting process.

3. The printer according to claim 1, wherein
said memory stores said instructions that, when executed by said processor, cause said printer to further perform
a determination process for determining whether or not a same setting state as said setting state included in said process setting information read is realizable by said printer, and wherein
in the case that it is determined in said determination process that said same setting state is unrealizable in said determination process, said initial state is set in said initial setting process by means of replacing said setting state with another setting state that is realizable by said printer.

4. The printer according to claim 1, further comprising
an operation device capable of executing a change operation for said initial state set in said initial setting process, wherein
in said printed matter production process, at least said feeder and said printing head are controlled on the basis of said initial state that reflects said change operation executed by said operation device.

5. The printer according to claim 1, further comprising
a detector that detects an overall medium-consumed state of said cartridge attached to said cartridge holder, wherein
in the case that said printed matter production process is executed on the basis of said setting state included in said process setting information read in said read process, the overall medium-consumed state of said cartridge of said specific type is detected by said detector, and a new cartridge of said specific type is attached to said cartridge holder,
subsequently, in said printed matter production process to be newly executed, at least said feeder and said printing head are controlled on the basis of said setting state in relation to said printed matter production process executed.

6. The printer according to claim 1, wherein
said setting items comprise at least one of a font setting, a decoration setting, a printing density setting, a printing speed setting, a resolution setting, a margin setting of a print-receiving medium, a template setting, and a bar code setting, for a case where said printing head forms said print object.

7. The printer according to claim 1, further comprising:
a cutter configured to fully cut off said print-receiving medium in a thickness direction of the print-receiving medium; and
a half cutter configured to partially cut said print-receiving medium in said thickness direction, wherein
said setting items comprise a cutting setting that indicates said full-cutting by said cutter or said half-cutting by said half cutter.

8. A printer comprising:
a cartridge holder that a cartridge configured to supply a print-receiving medium is attached and detached;
a feeder configured to feed said print-receiving medium supplied from said cartridge that is attached to said cartridge holder;
a printing head configured to execute formation of a print object on said print-receiving medium fed by said feeder;
a processor configured to control at least said feeder and said printing head to execute a printed matter production process for producing a desired printed matter; and
a memory, and
said cartridge of a specific type being attached to or detached from said cartridge holder,
said cartridge of the specific type having a cartridge memory storing process setting information that comprises a setting state for at least one setting item in relation to said printed matter production process in a past executed by using said print-receiving medium in said cartridge,
said memory storing computer-executable instructions that, when executed by said processor, cause said printer to perform:
a read process for reading said process setting information stored in said cartridge memory of said cartridge of said specific type, triggered by attachment of said cartridge of said specific type to said cartridge holder; and
said printed matter production process for controlling at least said feeder and said printing head on the basis of said setting state included in said process setting information read in said read process, wherein
said memory stores said instructions that, when executed by said processor, cause said printer to further perform
when said process setting information is read in said read process, in accordance with said setting state of said setting item included in the process setting information read, an initial setting process for setting an initial state of said setting item in said printed matter production process executed thereafter, and wherein
in the case that plural setting states having dates and times of execution thereof each different from each other in one said setting item included in said process setting information read are present, at least one said initial state in said one setting item is set while give priority to said setting state having a new date and a new time of execution thereof in said initial setting process.

9. The printer according to claim 8, wherein
said memory stores said instructions that, when executed by said processor, cause said printer to further perform
an announcement process for announcing said initial state set in said initial setting process.

10. The printer according to claim 8, wherein
said memory stores said instructions that, when executed by said processor, cause said printer to further perform
a determination process for determining whether or not a same setting state as said setting state included in said process setting information read is realizable by said printer, and wherein
in the case that it is determined in said determination process that said same setting state is unrealizable in said determination process, said initial state is set in said initial setting process by means of replacing said setting state with another setting state that is realizable by said printer.

11. The printer according to claim 8, further comprising
an operation device capable of executing a change operation for said initial state set in said initial setting process, wherein
in said printed matter production process, at least said feeder and said printing head are controlled on the basis of said initial state that reflects said change operation executed by said operation device.

12. A printer comprising:
a cartridge holder that a cartridge configured to supply a print-receiving medium is attached and detached;
a feeder configured to feed said print-receiving medium supplied from said cartridge that is attached to said cartridge holder;
a printing head configured to execute formation of a print object on said print-receiving medium fed by said feeder;
a processor configured to control at least said feeder and said printing head to execute a printed matter production process for producing a desired printed matter; and
a memory, and
said cartridge of a specific type being attached to or detached from said cartridge holder,
said cartridge of the specific type having a cartridge memory storing process setting information that comprises a setting state for at least one setting item in relation to said printed matter production process in a past executed by using said print-receiving medium in said cartridge,
said memory storing computer-executable instructions that, when executed by said processor, cause said printer to perform:
a read process for reading said process setting information stored in said cartridge memory of said cartridge of said specific type, triggered by attachment of said cartridge of said specific type to said cartridge holder; and
said printed matter production process for controlling at least said feeder and said printing head on the basis of said setting state included in said process setting information read in said read process, wherein
said memory stores said instructions that, when executed by said processor, cause said printer to further perform
a write process for writing said process setting information in relation to said printed matter production process into said cartridge memory of said cartridge holder, triggered by execution of said printed matter production process as a result of control of said feeder and said printing head by said processor after said process setting information is read in said read process.

13. The printer according to claim 12, wherein
in said write process, after said printed matter production process is executed, when a power source of said printer is turned off, said process setting information is written into said cartridge memory.

14. The printer according to claim 12, wherein
in said write process, after said printed matter production process is executed, when a cartridge cover that covers said cartridge holder is opened, said process setting information is written into said cartridge memory.

15. The printer according to claim 12, wherein
said memory stores said instructions that, when executed by said processor, cause said printer to further perform
a deletion process for deleting said process setting information that is oldest written in said cartridge memory, triggered by execution of writing in said writing process.

* * * * *